(12) United States Patent
Burroughs et al.

(10) Patent No.: US 7,590,776 B1
(45) Date of Patent: Sep. 15, 2009

(54) DATA STORAGE TECHNIQUES UTILIZING HOST-SIDE MULTIPLEXERS

(75) Inventors: John V. Burroughs, Mason, MA (US); Stephen Strickland, Marlboro, MA (US); Bassem N. Bishay, Attleboro, MA (US)

(73) Assignee: EMC Corporation, Hopkinton, MA (US)

( * ) Notice: Subject to any disclaimer, the term of this patent is extended or adjusted under 35 U.S.C. 154(b) by 894 days.

(21) Appl. No.: 10/746,317

(22) Filed: Dec. 24, 2003

(51) Int. Cl.
*G06F 3/00* (2006.01)
*H04L 12/66* (2006.01)
*H04J 3/26* (2006.01)

(52) U.S. Cl. .................... 710/51; 370/352; 370/432
(58) Field of Classification Search ............ 710/51
See application file for complete search history.

(56) References Cited

U.S. PATENT DOCUMENTS

| | | | |
|---|---|---|---|
| 6,702,620 B2 | 3/2004 | Lynch et al. | 439/638 |
| 6,829,658 B2 | 12/2004 | Beauchamp et al. | 710/16 |
| 6,850,410 B2 | 2/2005 | Peeke et al. | 361/685 |
| 6,857,909 B2 | 2/2005 | Lee et al. | 439/638 |
| 6,862,173 B1 | 3/2005 | Konshak et al. | 361/685 |
| 6,875,044 B1 | 4/2005 | Lee | 439/404 |
| 6,915,367 B2* | 7/2005 | Gary et al. | 710/244 |
| 6,993,610 B2* | 1/2006 | Coffey et al. | 710/74 |
| 7,065,661 B2* | 6/2006 | Borsini et al. | 713/300 |
| 7,073,022 B2* | 7/2006 | El-Batal et al. | 711/114 |
| 7,085,861 B2* | 8/2006 | Chiang et al. | 710/38 |
| 7,281,063 B2* | 10/2007 | Benson et al. | 710/2 |
| 2004/0083323 A1* | 4/2004 | Rabinovitz et al. | 710/315 |
| 2004/0117545 A1* | 6/2004 | Borsini et al. | 711/112 |
| 2004/0193737 A1* | 9/2004 | Huffman et al. | 710/1 |
| 2005/0251588 A1* | 11/2005 | Hoch et al. | 710/5 |

OTHER PUBLICATIONS

Serial ATA: High Speed Serialized AT Attachment, Revision 1.0a, Jan. 7, 2003, APT Technologies, Inc., Dell Computer Corporation, Intel Corporation, Maxtor Corporation, Seagate Technology, pp. 1-310.
Serial ATA II: Extensions to Serial ATA 1.0a, Revision 1.1, Oct. 9, 2003, Dell Computer Corporation, Intel Corporation, Maxtor Corporation, Vitesse Semiconductor Corporation.

* cited by examiner

*Primary Examiner*—Henry W. H. Tsai
*Assistant Examiner*—Michael Sun
(74) *Attorney, Agent, or Firm*—Bainwood Huang

(57) ABSTRACT

A data storage system has a circuit board module, a set of Serial ATA devices, and a set of Serial ATA cables connecting the circuit board module to the set of Serial ATA devices. The circuit board module includes a circuit board, multiple host circuits mounted to the circuit board and multiplexer circuitry mounted to the circuit board. Each host circuit is configured to perform data storage operations on the behalf of an external client. The multiplexer circuitry is configured to (i) receive control signals from the host circuits and (ii) provide communications pathways between the host circuits and the set of Serial ATA devices in response to the control signals. Such an embodiment alleviates the need for multiple versions of disk drive assemblies and their associated costs.

19 Claims, 5 Drawing Sheets

DATA STORAGE TECHNIQUES UTILIZING HOST-SIDE MULTIPLEXERS

BACKGROUND

A computerized system which utilizes the Serial ATA interface for disk drive storage typically includes a host, a set of Serial ATA disk drive assemblies and a set of Serial ATA cables connecting the host to the set of Serial ATA disk drive assemblies. In the context of a data storage system, the host typically takes the form of a motherboard containing, among other things, (i) processing circuitry configured to perform data storage operations (e.g., caching operations, read and write operations with the set of Serial ATA disk drive assemblies, etc.) and (ii) Serial ATA motherboard connectors which provide Serial ATA access to and from the motherboard, i.e., electronic access in accordance with the Serial ATA interface specification. Additionally, each disk drive assembly typically includes (i) a disk drive chassis (or housing), (ii) a disk drive unit mounted to the disk drive chassis, and (iii) a Serial ATA disk drive connector which is also mounted to the disk drive chassis and which provides Serial ATA access to and from the disk drive unit. The set of Serial ATA cables includes wires which are terminated at each end with Serial ATA cable connectors to interconnect the host with the Serial ATA disk drive assemblies. At least a portion of the Serial ATA interface specification is described in a document entitled "Serial ATA: High Speed Serialized AT Attachment", Revision 1.0a, Jan. 7, 2003, the teachings of which are hereby incorporated by reference herein in their entirety.

To construct the data storage system, an installer typically fastens the set of Serial ATA cables to a main support (e.g., a standard electronic equipment rack, a custom-sized cabinet or frame, etc.). The installer then fastens the motherboard to the main support and connects the Serial ATA motherboard connectors of the motherboard to corresponding Serial ATA cable connectors at one end of the set of Serial ATA cables. The installer then attaches the Serial ATA disk drive assemblies to the main support and connects the Serial ATA disk drive connectors of the disk drive assemblies to corresponding Serial ATA cable connectors at the other end of the set of Serial ATA cables. Typically, the chassis of the disk drive assemblies are designed so that the disk drive assemblies easily slide into and out of the main support to facilitate servicing (e.g., for hot swapping, replacement, future upgrading, etc.).

In contrast to the above-described relatively simple Serial ATA disk drive assemblies, some equipment manufacturers provide enhanced Serial ATA disk drive assemblies which, in addition to listed components of the above-described simpler disk drive assemblies, further include (i) a second Serial ATA disk drive connector and (ii) a daughter card which interconnects between the two Serial ATA disk drive connectors and the disk drive unit. The daughter card includes a multiplexer that is capable of switching between the two Serial ATA disk drive connectors thus enabling two hosts to have access to the disk drive unit, i.e., a first host through one Serial ATA disk drive connector and a second host through the other Serial ATA disk drive connector. Such enhanced disk drive assemblies enable data storage systems to utilize a primary host and a backup host for fault tolerance purposes. In particular, if the primary host fails (e.g., crashes), the backup host then begins operation. In such a situation, the device-side multiplexers of the disk drive assemblies switch selection from the Serial ATA disk drive connector leading to the primary host to the Serial ATA disk drive connector leading to the backup host to provide the backup host with access to the disk drive units of the disk drive assemblies thus enabling the data storage system as a whole to remain in operation.

SUMMARY

Unfortunately, there are deficiencies to using the above-described enhanced Serial ATA disk drive assemblies. For example, to provide both (i) a low-end system having a single host and the simpler disk drive assemblies and (ii) a higher-end system having two hosts for fault tolerance and the enhanced disk drive assemblies, manufacturers must either (i) carry two versions of Serial ATA disk drive assemblies and two versions of Serial ATA cable assemblies, or (ii) include the enhanced disk drive assemblies and the enhanced cable assemblies in the low-end system thus penalizing the low-end system with an unnecessary cost burden.

In the first scenario (i.e., when a manufacturer carries two version of Serial ATA disk drive and cable assemblies), for the low-end system having the single host, the manufacturer must carry simple Serial ATA disk drive assemblies (i.e., assemblies with a single Serial ATA disk drive connector and with no daughter cards) and a simple set of Serial ATA cables (i.e., a set of Serial ATA cables that provides pathways between the single host and each Serial ATA disk drive assembly). Additionally, for the higher-end system having two hosts, the manufacturer must carry enhanced Serial ATA disk drive assemblies (i.e., assemblies with two Serial ATA disk drive connectors and with daughter cards having device-side multiplexers) and a more-complex set of Serial ATA cables (i.e., a set of Serial ATA cables that provides a first set of pathways between the primary host and each Serial ATA disk drive assembly, and a second set of pathways between the backup host and each Serial ATA disk drive assembly).

Manufacturers carrying two versions of disk drive assemblies and two cable assemblies incur certain associated costs such as making, stocking and supporting both versions of cable assemblies and both versions of disk drive assemblies. The costs associated with the higher-end system are particularly burdensome to the manufacturer. For example, the complex set of Serial ATA cables for the higher-end system includes essentially two of the simpler sets of Serial ATA cables in order to provide a first set of pathways from the primary host to each Serial ATA disk drive assembly and a second set of pathways from the backup host to each Serial ATA disk drive assembly. As another example, the enhanced Serial ATA disk drive assemblies requires all of the components of a simpler Serial ATA disk drive assembly plus an additional Serial ATA disk drive connector and a daughter card having a device-side multiplexer to switch between Serial ATA disk drive connectors. Moreover, the manufacture must now provide a new circuit board fabrication process dedicated to making the daughter cards, and each daughter card requires additional support circuitry such as safety circuits to protect against overvoltage conditions, interfacing circuitry to interface with the Serial ATA cables and with the disk drive units, etc.

Furthermore, when the manufacturer supplies two versions of disk drive assemblies, the manufacturer makes the upgrade path from a single-host system to a dual-host system more difficult. In particular, if a customer first purchases a low-end single-host system with simple disk drive assemblies, the customer must then add a second host plus upgrade the disk drive assemblies to the enhanced version that has the daughter cards with multiplexers in order to change the configuration into the dual-host system. The task of migrating data from the simple disk drive assemblies to the enhanced disk drive assemblies can be extremely complex, error prone and costly.

In the second scenario (i.e., when the manufacturer includes the enhanced disk drive assemblies and the enhanced cable assemblies in the low-end system), manufacturer bears the additional cost burden for the enhanced assemblies in the low-end system thus putting the manufacturer at a disadvantage compared to other manufacturers who simply offer a low-end system with the simpler versions of the Serial ATA disk drive assemblies and Serial ATA cable assemblies.

In contrast to the above-described conventional approach to providing two versions of Serial ATA cables and Serial ATA disk drive assemblies in support of a simple single-host system and an enhanced two-host system, embodiments of the invention are directed to data storage techniques which utilize host-side multiplexer circuitry (e.g., multiplexer circuitry which is on the same side of the Serial ATA cables as the hosts) to communicate with Serial ATA disk drive assemblies. Such techniques enable manufacturers to provide both a low-end single host system and a higher-end two-host system but still carry only a single version of a Serial ATA cable set and a Serial ATA disk drive assembly (e.g., simple Serial ATA disk drive assemblies with no multiplexers and only one Serial ATA disk drive connector) rather than two versions thus saving the manufacturer the costs associated with manufacturing and carrying two versions.

One embodiment of the invention is directed to a data storage system having a circuit board module, a set of Serial ATA devices, and a set of Serial ATA cables connecting the circuit board module to the set of Serial ATA devices. The circuit board module includes a circuit board, multiple host circuits mounted to the circuit board and multiplexer circuitry mounted to the circuit board. Each host circuit is configured to perform data storage operations on the behalf of an external client. The multiplexer circuitry is configured to (i) receive control signals from the host circuits and (ii) provide communications pathways between the host circuits and the set of Serial ATA devices in response to the control signals. Such an embodiment alleviates the need for multiple versions of disk drive assemblies and their associated costs.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to data storage techniques which utilize host-side multiplexer circuitry (e.g., multiplexer circuitry which is on the same side of the Serial ATA cables as the hosts) to communicate with Serial ATA disk drive assemblies. Such techniques enable manufacturers to provide both a low-end single host system and a higher-end multiple-host system but still carry only a single version of a Serial ATA cable set and a Serial ATA disk drive assembly (e.g., simple Serial ATA disk drive assemblies with no multiplexers and a single Serial ATA disk drive connector) for use in both systems. There is no need for the manufacturer to make, stock and support two versions of disk drive assemblies and two versions of cable assemblies as in a conventional approach to providing both a low-end single-host system and a high-end two-host system (e.g., there is no need for a version of a Serial ATA disk drive assembly having daughter cards and multiple Serial ATA disk drive connectors for a high-end two-host system).

Figure 1:
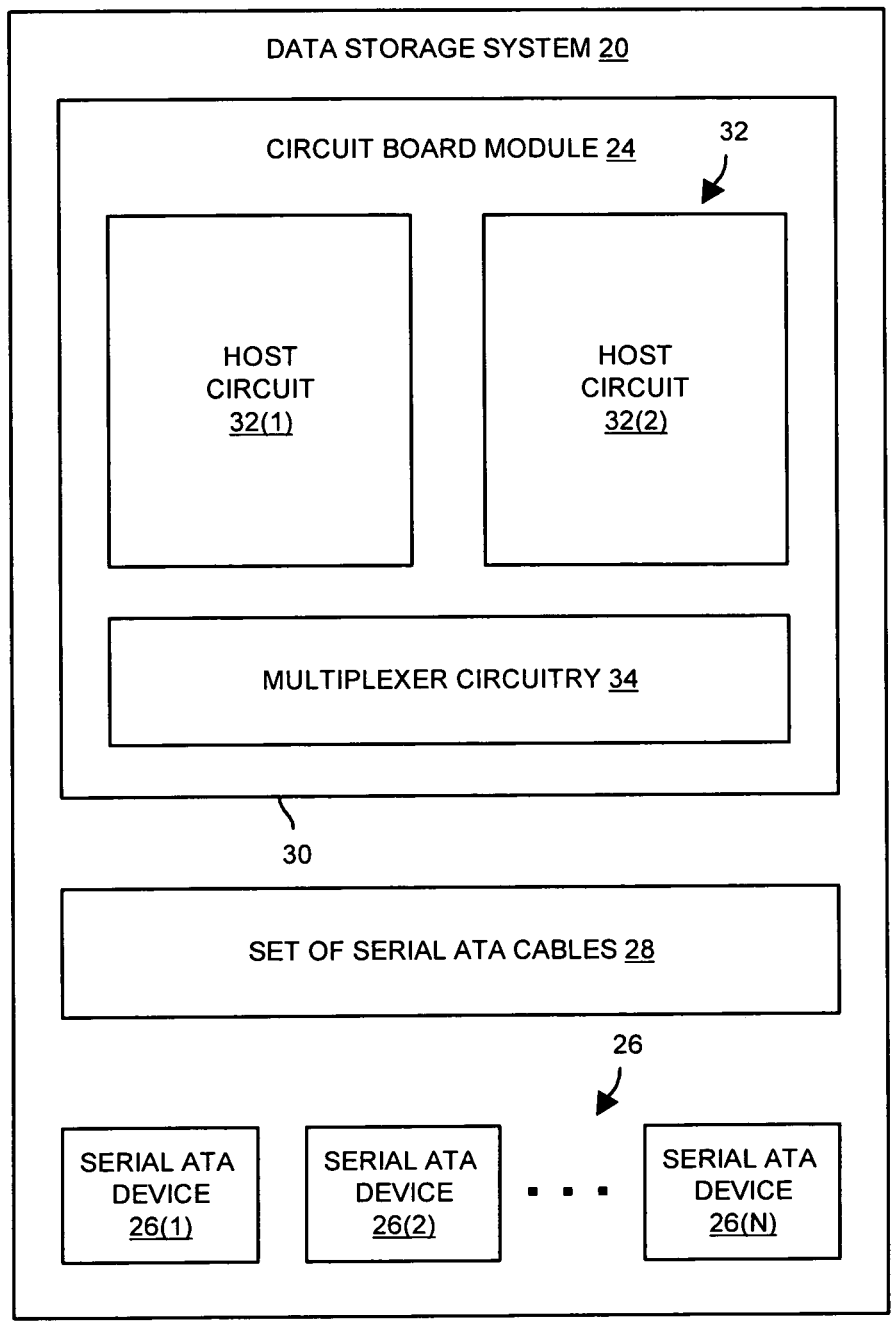
FIG. 1 is a block diagram of a data storage system which is suitable for use by the invention.

FIG. 1 shows a data storage system 20 which is suitable for use by the invention. As shown, the data storage system 20 performs a variety of data storage operations on behalf of a set of external clients 22(1), . . . , 22(M) (collectively, external clients 22). By way of example only, such operations include but are not limited to load and store operations, caching operations, read-modify-write operations, etc.

As shown in FIG. 1, the data storage system 20 includes (among other things) a circuit board module 24, a set of Serial ATA devices 26(1), . . . , 26(N) (collectively, Serial ATA devices 26) and a set of Serial ATA cables 28 which connects the circuit board module 24 to the set of Serial ATA devices 26. By way of example only, the Serial ATA devices 26 are Serial ATA disk drive assemblies which are configured to store and retrieve data in a non-volatile manner.

As further shown in FIG. 1, the circuit board module 24 includes a circuit board 30, multiple host circuits 32(1), 32(2) (collectively host circuits 32) mounted to the circuit board 30, and multiplexer circuitry 34 also mounted to the circuit board 30. Each host circuit 32 is configured to perform data storage operations on the behalf of one or more external client 22, and to perform such operations independently of and concurrently with data storage operations performed by the other host circuit 32. Accordingly, the data storage system 20 is well-suited for operating in an active-active manner in which the multiple host circuits 32 perform data storage operations simultaneously in order to achieve greater throughput, i.e., a greater number of operations in a given amount of time than that provided by only one host circuit 32 operating during that time.

As will be explained in further detail shortly, the multiplexer circuitry 34 of the circuit board module 24 is configured to (i) receive control signals from the host circuits 32 and (ii) provide communications pathways between the host circuits 32 and the set of Serial ATA devices 26 in response to the control signals. Since the multiplexer circuitry 34 resides on the host-side of the Serial ATA cables 28, the same set of Serial ATA devices 26 and the same set of Serial ATA cables 28 can be used in a data storage system configuration that includes only a single host circuit 32 (i.e., a circuit board module having only one host circuit 32) even though the data storage system 20 has two host circuits 32. That is, there is no need for any special accommodations in either the set of Serial ATA devices 26 or the set of Serial ATA cables 28 (e.g., no enhanced Serial ATA disk drive assembly having (i) daughter cards with multiplexers and (ii) extra Serial ATA disk drive connectors, no need for a set of complex Serial ATA cables configured to connect multiple hosts to the enhanced Serial ATA disk drive assemblies, etc.). Rather, the data storage system 20 is capable of using the same set of Serial ATA devices and cables as that used in a lower-end data storage system having only a single host circuit 32. As a result, a manufacturer is capable of (i) providing both a lower-end data storage system as well as a higher-end data storage system (i.e., the data storage system 20) but (ii) making, stocking and supporting a single version of a Serial ATA disk drive and a single version of a set of Serial ATA cables thus minimizing costs. Further details of the invention will now be provided with reference to FIG. 2.

Figure 2:
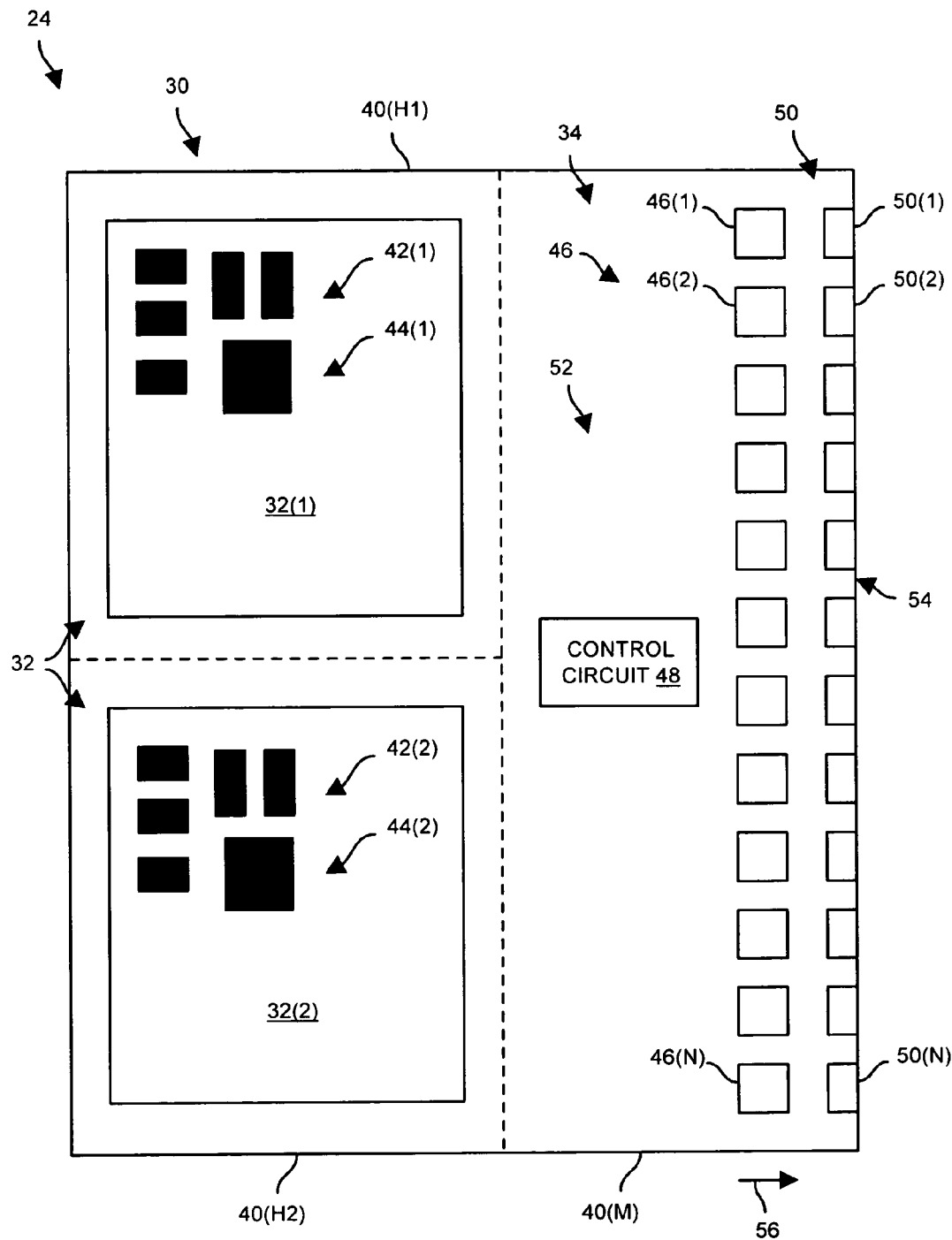
FIG. 2 is a top view of a multi-host circuit board module of the data storage system of FIG. 1.

FIG. 2 shows the circuit board module 24 of the data storage system 20. The circuit board 30 of the circuit board module 24 includes a first host section 40(H1), a second host section 40(H2) which is adjacent to the first host section 40(H1) in a side-by-side manner, and a multiplexer section 40(M) which is disposed adjacent to both the first host section 40(H1) and the second host section 40(H2). The sections 40(H1), 40(H2), 40(M) (collectively, circuit board sections 40) include layers of conductive material and non-conductive material sandwiched together into a rigid, plane-shaped member that supports a variety of circuit board components (e.g., integrated circuit devices, discrete components, connectors, etc.). These components in combination with the conductive material (e.g., signal traces, ground planes, power planes, etc.) form the various circuits 32(1), 32(2), 34 of the circuit board module 24.

As shown in FIG. 2, the host circuit 32(1) includes a set of circuit board components 42(1) and electrical connections 44(1) (shown generally by the arrow 44(1)) which enable the components 42(1) to communicate with each other. Similarly, the host circuit 32(2) includes a set of circuit board components 42(2) and electrical connections 44(2) (shown generally by the arrow 44(2)) which enable the components 42(2) to communicate with each other. As will be explained in further detail shortly, the electrical connections 44(1), 44(2) further enable the host circuits 32(1), 32(2) to exchange handshaking signals and thus coordinate access to the Serial ATA devices 26 through the multiplexer circuitry 34.

The multiplexer circuitry 34 includes a set of multiplexers 46(1), ... , 46(N) (collectively, multiplexers 46), a control circuit 48, a set of Serial ATA connectors 50(1), ... 50(N) (collectively, Serial ATA connectors 50), and electrical connections 52 (shown generally by the arrow 52). The electrical connections 52 interconnect the various components of the multiplexer circuitry 34 together as well as connect the multiplexer circuitry 34 to the host circuits 32. It should be understood that the host-side location of the multiplexers 46 alleviates the need for daughter cards having multiplexers and associated support circuitry (e.g., overvoltage protection circuitry, extra communications circuitry, etc.) on the Serial ATA devices 26 since host switching is accommodated on the circuit board module 24. Accordingly, the multiplexers circuitry 34 is capable of leveraging off of the resources that are already available on the circuit board module 24 (e.g., overvoltage protection circuitry, etc.). In one arrangement, the Serial ATA connectors 50 reside along a common connecting edge 54 defined by the circuit board 30 thus enabling the circuit board module 24 conveniently engage with the set of Serial ATA cables 28 when moved in a single direction (e.g., when moved in the direction of the arrow 56 of FIG. 2).

It should be understood that, for each Serial ATA device 26 in the data storage system 20, the multiplexer circuitry 34 includes a dedicated multiplexer 46 and a dedicated Serial ATA connector 50. In one arrangement, the data storage system 20 provides capacity for up to 12 Serial ATA devices 26 (e.g., to provide a storage array of N disk drives where N equals 12) so that there are 12 discrete multiplexers 46 and 12 discrete Serial ATA connectors on the circuit board 30 respectively corresponding to the 12 Serial ATA devices 26. During operation, the host circuits 32 communicate with each other, with the control circuit 48, and with the Serial ATA devices 26 to share access to the Serial ATA devices 26. The control circuit 48 switches the multiplexers 46 back and forth between the host circuits 32 to furnish communications pathways from both host circuits 32 to the Serial ATA devices 26 in a time multiplexed manner for robust and reliable access. Further details of the invention will now be provided with reference to FIGS. 3 and 4.

Figure 3:
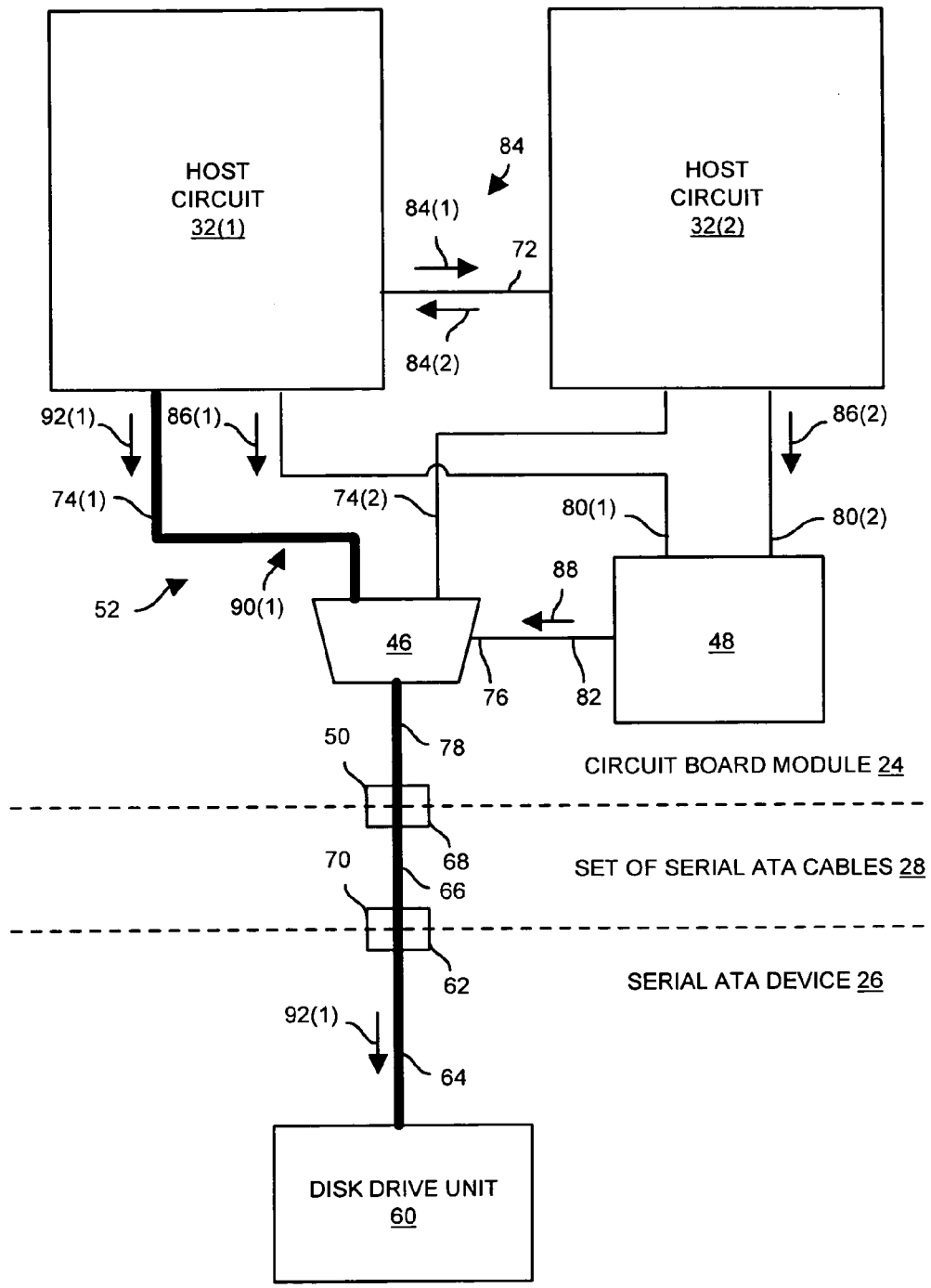
FIG. 3 is a block diagram of various components the data storage system of FIG. 1 illustrating operation of a multiplexer of the data storage system when the multiplexer connects a first host circuit with a Serial ATA device.
Figure 4:
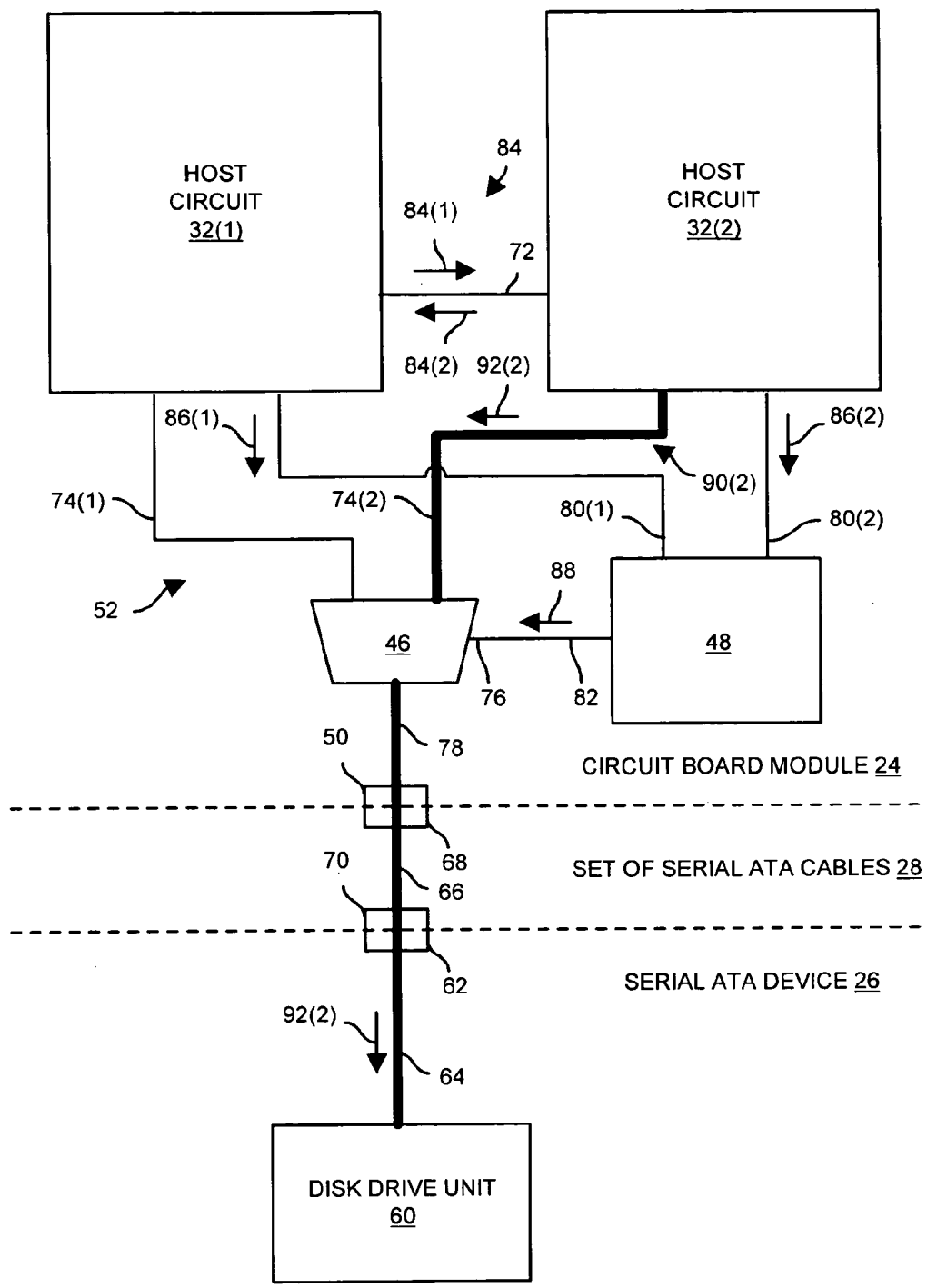
FIG. 4 is a block diagram of the various components of FIG. 3 illustrating operation of the multiplexer of the data storage system when the multiplexer connects a second host circuit with the Serial ATA device.

FIGS. 3 and 4 are block diagrams of various components of the data storage system 20 which participate in sharing access to a particular Serial ATA device 26. As shown, the Serial ATA device 26 includes a disk drive unit 60, a Serial ATA connector 62 and a communications medium 64 (e.g., a short segment of cable) interconnecting the disk drive unit 60 with the Serial ATA connector 62. The set of Serial ATA cables 28 (also see FIG. 1) includes a single Serial ATA cable 28 having a segment of cable 66, a host-side Serial ATA connector 68 and a device-side Serial ATA connector 70 (two cables are not required as in a conventional approach which places a daughter card having a multiplexer on the device-side). On the circuit board module 24, the participating components include, among other things, a particular multiplexer 46 and a particular Serial ATA connector 50 of the multiplexer circuit 34 which correspond to the Serial ATA device 26.

As shown in FIGS. 3 and 4, the host-side Serial ATA connector 68 of the Serial ATA cable 28 connects to the Serial ATA connector 50 of the multiplexer circuit 34. Similarly, the device-side Serial ATA connector 70 of the Serial ATA cable 28 connects to the Serial ATA connector 62 of the Serial ATA device 26. As a result, a single Serial ATA communications pathway exists between the multiplexer 46 and the Serial ATA device 26 (illustrated by the thickened line extending from the multiplexer 46 to the Serial ATA device 26 in FIGS. 3 and 4).

It should be understood that (i) there is only one Serial ATA cable 28 leading from the Serial ATA device 26 to the circuit board module 24, and that the Serial ATA device 26 has a single-port configuration (i.e., there is only a single Serial ATA communications pathway to and from the disk drive unit 60) since the multiplexer 46 resides on the host-side of the Serial ATA cable 28. In view of this feature, a manufacturer is capable of using the same Serial ATA cable 28 and the same Serial ATA device 26 in lower-end single-host systems, and thus is not burdened with needing to carry multiple versions of Serial ATA cables and devices (or alternatively penalizing the low-end system with the cost burden of using enhanced disk drive assemblies with daughter cards and enhanced cable assemblies) when providing both the lower-end single-host systems and the data storage system 20. Rather, the Serial ATA cable 28 and the Serial ATA device 26 are suitable for use in both types of systems thus lowering costs to make, stock and support such systems. Moreover, using the Serial ATA cable 28 and the Serial ATA device 26 provides a simple upgrade path from a single-host system to the multi-host system 20 (see FIG. 1) which simply involves adding another host circuit 32 but does not requiring replacing any disk drive. Further details of how the host circuits 32 share access to the Serial ATA device 26 of FIGS. 3 and 4 will now be provided.

As shown in FIGS. 3 and 4, the host circuits 32 include a communications channel 72 which is formed by the electrical connections between the host circuits 32 (also see the connections illustrated by the arrows 44(1), 44(2) in FIG. 2). Additionally, the multiplexer 46 includes two host ports 74(1), 74(2), a control interface 76, and a device port 78. The control circuit 48 includes host ports 80(1), 80(2) and an multiplexer interface 82.

The connections within the multiplexer circuitry 34 (also see the connections illustrated by the arrow 52 in FIG. 2) connect the multiplexer 46 and the control circuit 48 as shown in FIGS. 3 and 4. In particular, the host ports 74(1), 74(2) of the multiplexer 46 respectively connect to the host circuits 32(1), 32(2). Additionally, the control interface 76 of the multiplexer 46 connects to the multiplexer interface 82 of the control circuit 48. Furthermore, the device port 78 of the multiplexer 46 connects to the Serial ATA connector 50. Also, the host ports 80(1), 80(2) of the control circuit 48 respectively connect to the host circuits 32(1), 32(2).

During operation, the host circuits 32 decide which host circuit 32 is to have access the Serial ATA device 26 by exchanging handshaking signals 84 through the communications channel 72. In particular, the host circuit 32(1) outputs handshaking signal 84(1) to the host circuit 32(2), and the host circuit 32(2) outputs handshaking signal 84(2) to the host circuit 32(1). A variety of sharing techniques are suitable for use such as exchanging request and confirmation messages, time multiplexing, arbitration schemes, etc.

Suppose, by way of example only, the host circuits 32 decide that the host circuit 32(1) is to have current access to the Serial ATA device 26. To this end, the host circuit 32(1) provides a control signal 86(1) to the host port 80(1) of the control circuit 48, and the host circuit 32(2) provides a control signal 86(2) to the host port 80(2) of the control circuit 48 to direct the control circuit 48 to direct the multiplexer 46 to select the host port 74(1). In response, the control circuit 48 outputs a control signal 88 on the multiplexer interface 82. The control interface 76 receives the control signal 88 and selects the host port 74(1) thus completing a Serial ATA communications pathway 90(1) from the host circuit 32(1) to the Serial ATA device 26, as shown in FIG. 3 (see the thickened line leading from the host circuit 32(1) to the Serial ATA device 26). Accordingly, the host circuit 32(1) is now capable of exchanging Serial ATA signals 92(1) with the Serial ATA device 26 (e.g., to store and/or retrieve data) (see FIG. 3).

Now suppose that the host circuits 32 decide that the host circuit 32(2) is to have access to the Serial ATA device 26, perhaps after further exchanging handshaking signals 84 through the communications channel 72. Again, the host circuit 32(1) provides the control signal 86(1) to the host port 80(1) of the control circuit 48, and the host circuit 32(2) provides the control signal 86(2) to the host port 80(2) of the control circuit 48 to direct the control circuit 48 to switch the multiplexer 46 to now select the host port 74(2). In response, the control circuit 48 outputs the control signal 88 on the multiplexer interface 82. The control interface 76 receives the control signal 88 and changes selection from the host port 74(1) to the host port 74(2) thus completing a new Serial ATA communications pathway 90(2) from the host circuit 32(2) to the Serial ATA device 26, as shown in FIG. 4 (see the thickened line leading from the host circuit 32(2) to the Serial ATA device 26). As a result, the host circuit 32(2) is now capable of exchanging Serial ATA signals 92(2) with the Serial ATA device 26 (e.g., to store and/or retrieve data) (see FIG. 4).

It should be understood that switching of access back to the host circuit 32(1) occurs in a manner similar to that described above when switching from the host circuit 32(1) to the host circuit 32(2), but in an opposite manner. Additionally, it should be understood that sharing of the Serial ATA device 26 can continue indefinitely as described above (by repeating the switching process) to provide the host circuits 32 with robust and reliable shared access to the Serial ATA device 26. Furthermore, it should be understood that a variety of steps can be taken to avoid resetting the Serial ATA device 26 and thus minimize switch over times when switching between host circuits 32 such as utilizing sleep commands (e.g., PARTIAL and/or SLUMBER) and wake commands (e.g., COMWAKE) to control PHY layer states between the Serial ATA device 26 and the host circuits 32 and thereby alleviate the need for the Serial ATA device 26 to reinitialize itself (e.g., there is no need for the device to perform a COMRESET sequence and reinitialize device features) during transitions of control between host circuits 32. Moreover, it should be understood that the above-provided features and operation exist for each Serial ATA device 26 and corresponding multiplexer 46 (also see FIG. 2). Further details of the invention will now be provided with reference to FIG. 5.

Figure 5:
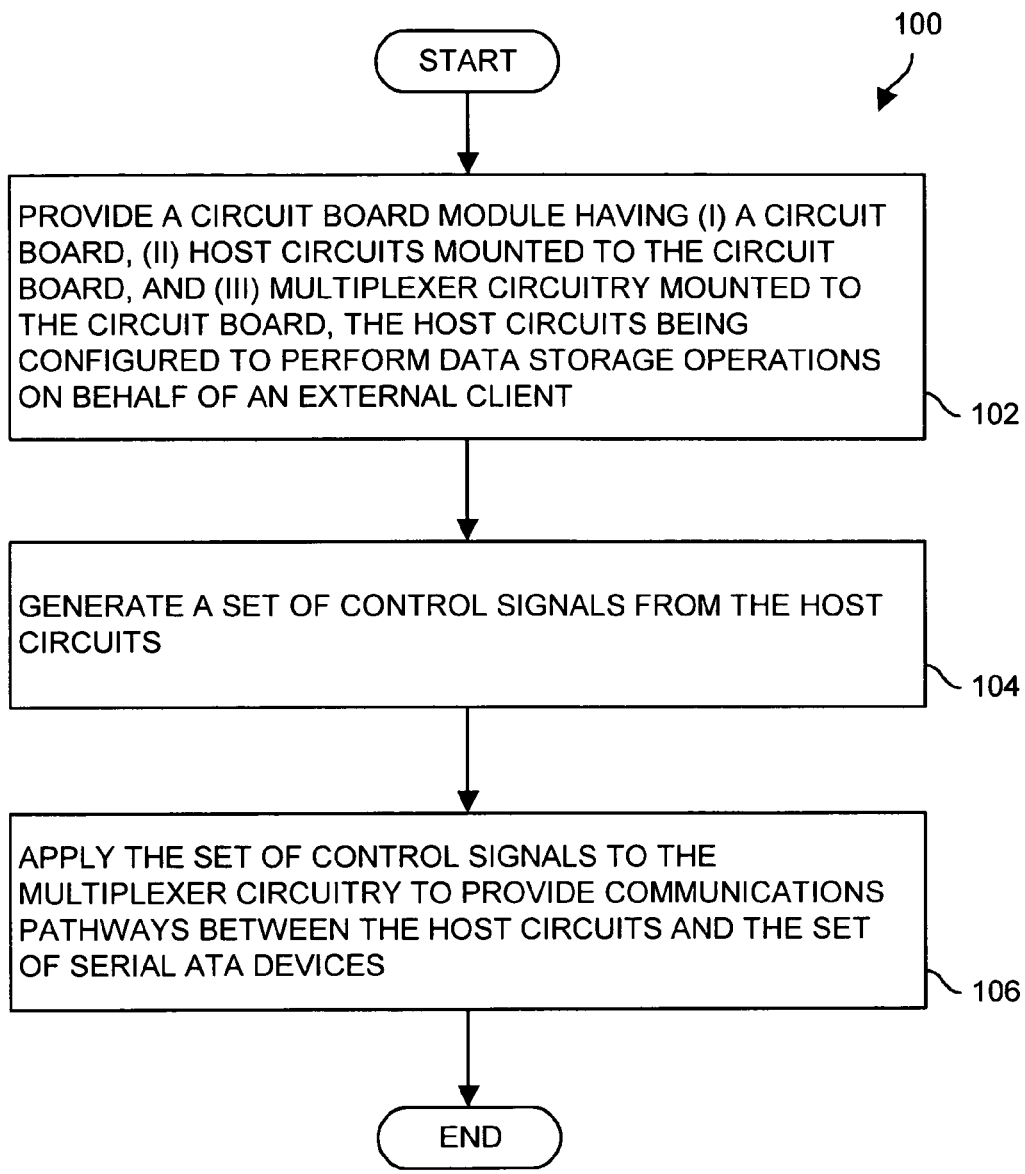
FIG. 5 is a flowchart of a procedure which is performed when carrying out data storage operations in accordance with an embodiment of the invention.

FIG. 5 is a flowchart of a procedure 100 which is performed by a user (e.g., a manufacturer, a customer, etc.) when carrying out data storage operations in accordance with an embodiment of the invention. In step 102, the user provides the circuit board module 24 having (i) the circuit board 30, (ii) the host circuits 32 mounted to the circuit board 30, and (ii) the multiplexer circuitry 34 mounted to the circuit board 30. As described earlier, each host circuit 32 is configured to perform data storage operations on the behalf of an external client 22. In steps 104 and 106, the user operates the data storage system 20 so that (i) the host circuits 32 generate control signals 86 and (ii) the control signals 86 direct the multiplexer circuitry 34 to provide communications pathways between the host circuits 32 and the set of Serial ATA devices 26. Steps 104 and 106, which typically occur concurrently and in an ongoing manner, enable (i) the host circuits 32 to operate simultaneously for increased throughput by the system as a whole and (ii) robust and reliable access of the Serial ATA devices 26 without any need for complex Serial ATA cable assemblies or enhanced Serial ATA disk drive assemblies (e.g., without disk drive assemblies having multiple Serial ATA connectors and daughter cards).

As described above, embodiments of the invention are directed to data storage techniques which utilize host-side multiplexer circuitry 34 to communicate with Serial ATA devices 26. Such techniques enable manufacturers to provide both a low-end single host system and the data storage system 20 (i.e., a higher-end multiple-host system) but still carry only a single version of a Serial ATA cable set and a Serial ATA disk drive assembly (e.g., simple Serial ATA disk drive assemblies with no multiplexers and a single Serial ATA disk drive connector) for use in both systems. There is no need for the manufacturer to make, stock and support two versions of disk drive assemblies and two versions of cable assemblies as in a conventional approach to providing both a low-end single-host system and a high-end two-host system (e.g., there is no need for a version of a Serial ATA disk drive assembly having daughter cards and multiple Serial ATA disk drive connectors for a high-end two-host system).

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the Serial ATA devices 26 were described above as including disk drive units by way of example only. In other arrangements, the Serial ATA devices 26 includes other types of devices such as diskette drives, tape drives, CD-ROM drives, combinations thereof, etc.

Additionally, it should be understood that the circuit board module 24 was described above as including two host circuits 32 by way of example only. In other arrangements, the circuit board module 24 has more than two host circuits 32 (e.g., three, four, etc.) for greater throughput (i.e., data storage operation capacity). For example, in one arrangement, the simpler two-host-port multiplexer 46 is replaced with a more-intelligent device which either (i) accommodates more than two host circuits 32 or (ii) simplifies the communications and/or protocols used in active-active switching.

Furthermore, it should be understood that the data storage system 20 was described above as having one circuit board module 24 by way of example only. It should be understood that data storage system 20 is capable of having multiple circuit board modules 24 for increased capacity. In particular, in other arrangements, the data storage system 20 has more than one circuit board module 24 has more than two host circuits 32 (e.g., three, four, etc.). In such arrangements, the multiplexers 46 are preferably disposed on a separate multiplexer circuit board, and the host circuit 32 (on respective circuit boards) connect to that separate multiplexer circuit board.

What is claimed is:

1. A data storage system, comprising:
   a circuit board module;
   a set of Serial ATA devices; and
   a set of Serial ATA cables connecting the circuit board module to the set of Serial ATA devices, the circuit board module including:
      a circuit board,
      multiple host circuits mounted to the circuit board, each host circuit being configured to perform data storage operations on the set of Serial ATA devices on the behalf of an external client, and
      multiplexer circuitry mounted to the circuit board, the multiplexer circuitry being configured to (i) receive control signals from the host circuits and (ii) provide communication pathways between the host circuits and the set of Serial ATA devices in response to the control signals;
   wherein the multiplexer circuitry of the circuit board module includes:
      a plurality of discrete multiplexer units, each multiplexer unit corresponding to a Serial ATA device of the set of Serial ATA devices and being configured to selectively provide (i) a first pathway between a first host circuit and that Serial ATA device, and (ii) a second pathway between a second host circuit and that Serial ATA device;
   wherein the circuit board of the circuit board module is planar in shape and includes:
      a first host section which supports the first host circuit;
      a second host section which supports the second host circuit and which is disposed adjacent to the first section in a side-by-side manner; and
      a multiplexer section which supports the plurality of discrete multiplexer units and which is disposed adjacent to both the first host section and the second host section;
   wherein the set of Serial ATA devices includes a set of single-ported Serial ATA disk drive assemblies;
   wherein the multiplexer section is disposed along a connecting edge of the circuit board;
   wherein the circuit board module further includes:
      a set of Serial ATA cable connectors disposed along the connecting edge of the circuit board, the set of Serial ATA cable connectors being configured to operate as a set of connecting interfaces for a set of Serial ATA cables leading from the set of Serial ATA cable connectors to the set of single-ported Serial ATA disk drive assemblies; and
   wherein the multiple host circuits mounted to the circuit board are further configured to send sleep and wake signals to the set of Serial ATA devices to prevent each of the Serial ATA devices from needing to reinitialize upon switching between the first pathway and the second pathway.

2. The data storage system of claim 1 wherein the multiplexer circuitry of the circuit board module includes:
   a control circuit configured to input the control signals from the host circuits and output a set of multiplexer signals to the plurality of discrete multiplexer units based on the control signals to coordinate use of the communication pathways among the host circuits.

3. The data storage system of claim 1 wherein the multiple host circuits of the circuit board module include:
   a first host circuit mounted to the circuit board, the first host circuit being configured to perform a first set of data storage operations; and
   a second host circuit mounted to the circuit board, the second host circuit being configured to perform a second set of data storage operations (i) simultaneously while the first host circuit performs the first set of data storage operations and (ii) independently of the first set of data storage operations.

4. A data storage system as in claim 1 wherein:
   the data storage system further includes a main support, the main support supporting the circuit board module, the set of Serial ATA cables attaching to the main support;
   the circuit board module is configured to slide into the main support such that,
      when slid in a first direction, the set of Serial ATA cable connectors of the connecting edge of the circuit board may engage with the set of Serial ATA cables attached to the main support, and
      when slid in a second direction, opposite the first direction, the set of Serial ATA cable connectors of the connecting edge of the circuit board may disengage with the set of Serial ATA cables attached to the main support.

5. A data storage system, comprising:
   a circuit board module;
   a set of Serial ATA devices; and
   a set of Serial ATA cables connecting the circuit board module to the set of Serial ATA devices, the circuit board module including:
      a circuit board,
      data storage means for performing data storage operations on the set of serial ATA devices on the behalf of an external client, and
      multiplexer circuitry mounted on the circuit board, the multiplexer circuitry being configured to (i) receive control signals from the data storage means and (ii) provide communication pathways between the data storage means and the set of Serial ATA devices in response to the control signals;
   wherein the multiplexer circuitry of the circuit board module includes:
      a plurality of discrete multiplexer units, each multiplexer unit corresponding to a Serial ATA device of the set of Serial ATA devices and being configured to selectively provide (i) a first pathway between a first host circuit and that Serial ATA device, and (ii) a second pathway between a second host circuit and that Serial ATA device;
   wherein the circuit board of the circuit board module is planar in shape and includes:
      a first host section which supports the first host circuit;

a second host section which supports the second host circuit and which is disposed adjacent to the first section in a side-by-side manner; and a multiplexer section which supports the plurality of discrete multiplexer units and which is disposed adjacent to both the first host section and the second host section;

wherein the set of Serial ATA devices includes a set of single-ported Serial ATA disk drive assemblies;

wherein the multiplexer section is disposed along a connecting edge of the circuit board;

wherein the circuit board module further includes:

a set of Serial ATA cable connectors disposed along the connecting edge of the circuit board, the set of Serial ATA cable connectors being configured to operate as a set of connecting interfaces for a set of Serial ATA cables leading from the set of Serial ATA cable connectors to the set of single-ported Serial ATA disk drive assemblies; and wherein the data storage means are further configured to send sleep and wake signals to the set of Serial ATA devices to prevent each of the Serial ATA devices from needing to reinitialize upon switching between the first pathway and the second pathway.

6. A data storage system as in claim 5 wherein:

the data storage system further includes a main support, the main support supporting the circuit board module, the set of Serial ATA cables attaching to the main support;

the circuit board module is configured to slide into the main support such that, when slid in a first direction, the set of Serial ATA cable connectors of the connecting edge of the circuit board may engage with the set of Serial ATA cables attached to the main support, and when slid in a second direction, opposite the first direction, the set of Serial ATA cable connectors of the connecting edge of the circuit board may disengage with the set of Serial ATA cables attached to the main support.

7. A circuit board module for carrying out data storage operations, comprising:

a circuit board;

multiple host circuits mounted to the circuit board, each host circuit being configured to perform data storage operations on a set of Serial ATA devices on the behalf of an external client; and multiplexer circuitry mounted on the circuit board, the multiplexer circuitry being configured to (i) receive control signals from the host circuits and (ii) provide communication pathways between the host circuits and the set of Serial ATA devices in response to the control signals;

wherein the multiplexer circuitry includes:

a plurality of discrete multiplexer units, each multiplexer unit corresponding to a Serial ATA device of the set of Serial ATA devices and being configured to selectively provide (i) a first pathway between a first host circuit and that Serial ATA device, and (ii) a second pathway between a second host circuit and that Serial ATA device;

wherein the circuit board is planar in shape and includes:

a first host section which supports the first host circuit;

a second host section which supports the second host circuit and which is disposed adjacent to the first section in a side-by-side manner; and a multiplexer section which supports the plurality of discrete multiplexer units and which is disposed adjacent to both the first host section and the second host section;

wherein the set of Serial ATA devices includes a set of single-ported Serial ATA disk drive assemblies;

wherein the multiplexer section is disposed along a connecting edge of the circuit board;

wherein the circuit board module further comprises:

a set of Serial ATA cable connectors disposed along the connecting edge of the circuit board, the set of Serial ATA cable connectors being configured to operate as a set of connecting interfaces for a set of Serial ATA cables leading from the set of Serial ATA cable connectors to the set of single-ported Serial ATA disk drive assemblies; and wherein the multiple host circuits mounted to the circuit board are further configured to send sleep and wake signals to the set of Serial ATA devices to prevent each of the Serial ATA devices from needing to reinitialize upon switching between the first pathway and the second pathway.

8. The circuit board module of claim 7 wherein the multiplexer circuitry includes:

a control circuit configured to input the control signals from the host circuits and output a set of multiplexer signals to the plurality of discrete multiplexer units based on the control signals to coordinate use of the communication pathways among the host circuits.

9. The circuit board module of claim 7 wherein the multiple host circuits include:

a first host circuit mounted to the circuit board, the first host circuit being configured to perform a first set of data storage operations; and a second host circuit mounted to the circuit board, the second host circuit being configured to perform a second set of data storage operations (i) simultaneously while the first host circuit performs the first set of data storage operations and (ii) independently of the first set of data storage operations.

10. A circuit board module as in claim 7 wherein the multiplexer circuitry includes:

a Serial ATA connector leading to a respective single-ported Serial ATA disk drive assembly; and a multiplexer circuit having (i) N host circuit ports, each host circuit port connecting to a respective host circuit, and (ii) a single Serial ATA port connecting to the Serial ATA connector leading to the respective Serial ATA disk drive, the multiplexer circuit being a N:1 multiplexer arranged to provide N bi-directional pathways between the N host circuits and the respective single-ported Serial ATA disk drive assembly through the Serial ATA connector.

11. A circuit board module as in claim 10 wherein the N:1 multiplexer is a 2:1 bi-directional multiplexer arranged to selectively connect one of two storage processors to the single-ported Serial ATA disk drive assembly through the Serial ATA connector.

12. A circuit board module as in claim 7 wherein:

the set of Serial ATA cables attach to a main support, the main support also supporting the circuit board;

the circuit board is configured to slide into the main support such that, when slid in a first direction, the set of Serial ATA cable connectors of the connecting edge of the circuit board may engage with the set of Serial ATA cables attached to the main support, and when slid in a second direction, opposite the first direction, the set of Serial ATA cable connectors of the connecting edge of the circuit board may disengage with the set of Serial ATA cables attached to the main support.

13. A circuit board module for carrying out data storage operations, comprising:
a circuit board;
data storage means for performing data storage operations on a set of Serial ATA devices on the behalf of an external client; and
multiplexer circuitry mounted on the circuit board, the multiplexer circuitry being configured to (i) receive control signals from the data storage means and (ii) provide communication pathways between the data storage means and the set of Serial ATA devices in response to the control signals;
wherein the multiplexer circuitry includes:
a plurality of discrete multiplexer units, each multiplexer unit corresponding to a Serial ATA device of the set of Serial ATA devices and being configured to selectively provide (i) a first pathway between a first host circuit and that Serial ATA device, and (ii) a second pathway between a second host circuit and that Serial ATA device;
wherein the circuit board is planar in shape and includes:
a first host section which supports the first host circuit;
a second host section which supports the second host circuit and which is disposed adjacent to the first section in a side-by-side manner; and
a multiplexer section which supports the plurality of discrete multiplexer units and which is disposed adjacent to both the first host section and the second host section;
wherein the set of Serial ATA devices includes a set of single-ported Serial ATA disk drive assemblies;
wherein the multiplexer section is disposed along a connecting edge of the circuit board;
wherein the circuit board module further comprises:
a set of Serial ATA cable connectors disposed along the connecting edge of the circuit board, the set of Serial ATA cable connectors being configured to operate as a set of connecting interfaces for a set of Serial ATA cables leading from the set of Serial ATA cable connectors to the set of single-ported Serial ATA disk drive assemblies; and
wherein the data storage means are further configured to send sleep and wake signals to the set of Serial ATA devices to prevent each of the Serial ATA devices from needing to reinitialize upon switching between the first pathway and the second pathway.

14. A circuit board module as in claim 13 wherein:
the set of Serial ATA cables attach to a main support, the main support also supporting the circuit board;
the circuit board is configured to slide into the main support such that,
when slid in a first direction, the set of Serial ATA cable connectors of the connecting edge of the circuit board may engage with the set of Serial ATA cables attached to the main support, and
when slid in a second direction, opposite the first direction, the set of Serial ATA cable connectors of the connecting edge of the circuit board may disengage with the set of Serial ATA cables attached to the main support.

15. A method for carrying out data storage operations, comprising:
providing a circuit board module having (i) a circuit board, (ii) multiple host circuits mounted to the circuit board, and (iii) multiplexer circuitry mounted to the circuit board, each host circuit being configured to perform data storage operations on a set of Serial ATA devices on behalf of an external client;
generating a set of control signals from the host circuits; and
applying the set of control signals to the multiplexer circuitry to provide communication pathways between the host circuits and the set of Serial ATA devices;
wherein the multiplexer circuitry includes a plurality of discrete multiplexer units, each multiplexer unit corresponding to a Serial ATA device of the set of Serial ATA devices; and wherein applying the set of control signals includes:
selectively providing through each of the plurality of discrete multiplexer units, (i) a first pathway between a first host circuit and the Serial ATA device corresponding to that multiplexer unit, and (ii) a second pathway between a second host circuit and the Serial ATA device corresponding to that multiplexer unit;
wherein providing the circuit board module includes:
forming, in the circuit board, (i) a first host section which supports the first host circuit, (ii) a second host section which supports the second host circuit and which is disposed adjacent to the first section in a side-by-side manner, and (iii) a multiplexer section which supports the plurality of discrete multiplexer units and which is disposed adjacent to both the first host section and the second host section;
wherein the set of Serial ATA devices includes a set of single-ported Serial ATA disk drive assemblies, wherein the multiplexer section is disposed along a connecting edge of the circuit board, and wherein the method further comprises:
prior to generating and applying the set of control signals, connecting a set of Serial ATA cable connectors disposed along the connecting edge of the circuit board to the set of single-ported Serial ATA disk drive assemblies using a set of Serial ATA cables; and
sending sleep and wake signals from the host circuits to the set of Serial ATA devices to prevent each of the Serial ATA devices from needing to reinitialize upon switching between the first pathway and the second pathway.

16. The method of claim 15 wherein applying the set of control signals to the multiplexer circuitry includes:
inputting the control signals through a control circuit of the multiplexer circuitry outputting a set of multiplexer signals to the plurality of discrete multiplexer units of the multiplexer circuitry based on the control signals to coordinate use of the communication pathways among the host circuits.

17. The method of claim 15, further comprising:
performing a first set of data storage operations using a first host circuit; and
performing a second set of data storage operations using a second host circuit, the second set of data storage operations being performed (i) simultaneously with the first set of data storage operations and (ii) independently of the first set of data storage operations.

18. A method as in claim 15 wherein the method further comprises:
attaching the set of Serial ATA cables to a main support, the main support also supporting the circuit board;
sliding the circuit board module in a first direction towards the main support such that the set of Serial ATA cable connectors of the connecting edge of the circuit board may engage with the set of Serial ATA cables attached to the main support.

19. A method as in claim 18 wherein the method further comprises:
sliding the circuit board module in a second direction away from the main support such that the set of Serial ATA cable connectors of the connecting edge of the circuit board may disengage with the set of Serial ATA cables attached to the main support.

* * * * *